United States Patent [19]

Pilgrim

[11] 4,303,722

[45] Dec. 1, 1981

[54] BUILDING COMPONENTS

[76] Inventor: Thomas A. Pilgrim, 41 Hollies Dr., Edwalton, Nottinghamshire, England

[21] Appl. No.: 155,370

[22] Filed: Jun. 2, 1980

[30] Foreign Application Priority Data

Jun. 8, 1979 [GB] United Kingdom ............ 19988/79

[51] Int. Cl.³ .................. B32B 7/02; B32B 13/02; B32B 13/04
[52] U.S. Cl. .................................... 428/213; 156/39; 156/42; 156/43; 428/215; 428/310; 428/313; 428/317; 428/703
[58] Field of Search ........................ 156/39, 42, 43; 428/310, 317, 703, 213, 215, 313

[56] References Cited

U.S. PATENT DOCUMENTS

| | | | |
|---|---|---|---|
| 3,984,266 | 10/1976 | Christensen et al. | 428/446 |
| 3,993,822 | 11/1976 | Knauf et al. | 428/317 |
| 4,133,928 | 1/1979 | Riley et al. | 428/259 |
| 4,159,361 | 6/1979 | Schupack | 428/308 |
| 4,203,788 | 5/1980 | Clear | 428/308 |

FOREIGN PATENT DOCUMENTS

| | | |
|---|---|---|
| 717109 | 10/1954 | United Kingdom . |
| 870937 | 6/1961 | United Kingdom ................ 428/703 |
| 918123 | 2/1963 | United Kingdom . |
| 921497 | 3/1963 | United Kingdom . |
| 1250713 | 10/1971 | United Kingdom . |
| 1318693 | 5/1973 | United Kingdom . |
| 1434889 | 5/1976 | United Kingdom . |
| 1521569 | 8/1978 | United Kingdom . |

Primary Examiner—William J. Van Balen
Attorney, Agent, or Firm—Robert M. Didrick; Samuel Kurlandsky; Robert H. Robinson

[57] ABSTRACT

Blocks or panels 10, more especially of porous or cellular structure, are faced with a fabric or web inorganic fibres, preferably in the form of glass fibre tissue, bonded to the block or panel by a composition 14 of thermosetting condensation polymer and gypsum, preferably in a ratio between 1:1.6 and 1:4.0. The amount of the composition is preferably such as to provide a film of minimal thickness over the surface of the fabric or web, corresponding to a glass: resin plus gypsum proportion of 8 to 25%. Such coatings when applied to foamed plastics, chip-board or glass fibre panels provide boards suitable for ceilings or partitions and having ample strength and flame resistance. The blocks or panels may be made continuously by applying fibrous tissues, impregnated with a fluid mixture of plaster and resin by roller spreaders, to the face of panel elements supported between release sheets, for example of polypropylene. Pressure may be applied and maintained, if desired, until the fluid mixture has set.

19 Claims, 2 Drawing Figures

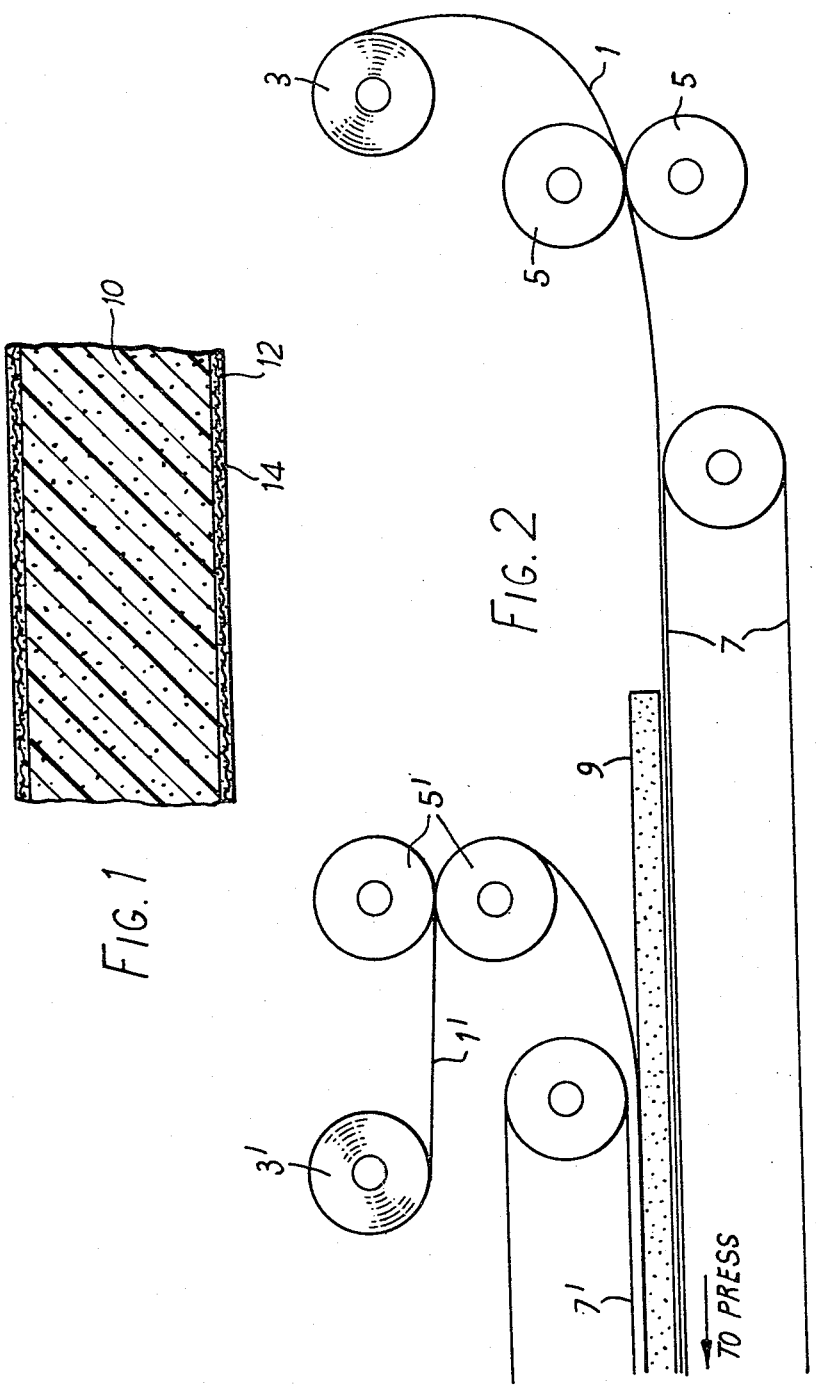

BUILDING COMPONENTS

This invention relates to a building or constructional component and to a method of making such a component.

Certain light-weight materials are already known which by themselves have limited utility in ceiling, partitioning and light constructional work due to inherent defects in the materials such as low spanning capability or low resistance to fire. Amongst such materials are foamed plastics material such as foamed polystyrene and polyurethane. Such foamed plastics also tend to have external faces which are not acceptable for traditional internal walls and surfaces.

Alternative materials used in ceiling, partitioning and light constructional work are various grades of plaster board, chip-board and bonded glass and rock fibre mats. Some of these materials have surfaces which are acceptable for traditional internal walls and some have better flame resistance than foamed plastics, but all could benefit from a flame-retardant, reinforcing surface finish.

Glass and other inorganic fibres have frequently been used to reinforce structures of gypsum and other cementitious materials but have usually been embedded in a mass of the cementitious material, by incorporation in the wet mix as chopped fibres or by insertion into the mix in the form of strands or fabric.

Synthetic resins have been previously employed in admixture with cementitious materials, such as gypsum, for the purpose of increasing the water-resistance or reducing the brittleness of the set material.

British Pat. No. 717,109 describes various cast panels and other articles composed of a cement such as gypsum, synthetic resin and glass fibres. The preferred products are moulded from mixtures containing from 5 to 25 parts by weight resin, especially condensation resins, and from 75 to 95 parts cement (that is a resin: cement ratio of 1:3 to 1:19) together with glass fibres of reinforcing length, usually in amounts of 1 to 10 percent. Typical products are formed from a mix of about 100 parts gypsum plaster, 25 parts amine-aldehyde resin (which in the context must refer to the commonly available liquid resin compositions) 15 to 30 parts water, 3 to 10 parts chopped glass fibres of ½ inch (13 mm) length and minor quantities of additives. Such mixes may be moulded under pressure between platens to form structural panels or tiles, or cast or spatulated onto the surface of a porous bonded mat of glass fibres. Reference is made elsewhere in the specification to the use of glass fibres in the form of a bonded web or woven mat, which can be impressed into a layer of the cementitious composition in concentrations up to 20 percent to form flexible panels of ¼ to ⅓ inch thickness. In another passage it is proposed to increase the ratio of resin:cement from 1:3 to 7:3 where the water released during condensation of the resin is taken up by gypsum or other cement that increases in volume during curing.

It has now been discovered that from these same basic constituents, namely gypsum, thermosetting condensation polymer and glass fibres, by careful selection of the form and manner of use of such materials, a reinforcing and flame-retardant facing with an unexpectedly regular, hard finish can be provided on a wide range of substantially rigid, preferably porous, panel materials.

Accordingly, the present invention provides a component comprising a substrate of substantially rigid material having on at least one surface a facing composed of a fabric or web of inorganic fibres and a set composition of thermosetting condensation polymer gypsum, the composition penetrating the fabric or web and bonding it to the surface of the substrate.

The properties and quality of the facing can be affected by the process by which it is produced. Preferably, the fabric or web and the composition of gypsum and resin are applied in such a manner that the composition serves essentially to bond the fabric or web to the block or panel with, if desired, a continuous film of the composition extending over the outer surface of the fabric or web.

According to a second aspect of the invention there is provided a method of making a building or constructional component comprising the steps of applying to at least one face of a substrate of substantially rigid material a fabric or web of inorganic fibres and a fluid aqueous composition of thermosetting condensation polymer precursor and calcium sulphate plaster, and causing or allowing the fluid composition to penetrate the fabric or web and bond it to the face of the substrate.

The principal benefit of the invention is in widening the field of application of substrate materials which have certain desirable properties, such as cheapness and lightness while improving such properties as flame resistance, moisture resistance, impact resistance and spanning capability.

Examples of substrate materials to which the surface coating can be applied with considerable advantage are cellular or other lightweight materials such as foamed plastics including polystyrene, urea-formadehyde, polyurethane, furan, polyisocyanurate, and phenol foams, in which the strength of the product is increased, the surface protected and the liability of the material to absorb water is reduced or eliminated. Other materials suitable for facing in accordance with the invention include bonded wood-fragment compositions such as chipboard, and glass and rock fibre mats.

It will be appreciated that although many of these materials are in all normal circumstances rigid, others may have some degree of resilience or flexibility. By the term 'substantially rigid' is here meant that the substrate is sufficiently resistant to distortion by pressure during production or utilization that the integrity of the cured facing is not impaired.

The calcium sulphate employed in the facing may be hemihydrate and/or anhydrous. The preferred cementitious ingredient is the hemihydrate (hemihydrate plaster). Various inert fillers and bulking agents may be associated with plaster and also active substances which act as modifiers of the set, for example to accelerate or retard it or alter the crystal habit. When other substances are associated with calcium sulphate in this invention, care should be taken that the substances do not deleteriously affect the setting properties of the resin used. Also the setting time of the plaster in the resin should preferably be arranged so that the hydration set has substantially occurred before the hardening or cure of the resin is complete; otherwise maximum strength of the facing will not be obtained.

The resin used for the facing is one that sets from a liquid state to a solid state accompanied by release of water. Such resins are generally thermosetting condensation polymers and generally include formaldehyde in the starting materials. Examples are phenolic resins, and aminoplasts such as urea-formaldehyde resins and melamine-formaldehyde resins. Of these, urea-formaldehyde resins are preferred and are usually employed in the form of aqueous compositions of their precursors. Urea-formaldehyde resins tend to shrink slightly on setting, thereby stressing and strengthening double faced components. The water provided by the resin composition enables the plaster to hydrate and set, and is preferably controlled so that both the resin and the calcium sulphate set completely. With urea-formaldehyde resins, which set best under acid pH conditions, it is advisable to avoid high carbonate content plasters and the use of those accelerators or retarders which interfere with the acid resin-setting conditions.

The preferred ratios of resin to gypsum in the facings according to this invention are from 1:1.6 to 1:4.0 based on the dry weight of resin solids and gypsum respectively. Condensation resins are often supplied in the form of aqueous prepolymer compositions, especially in the case of amide-aldehyde resins, of which the solids content is about 60 to 75%. With such liquid compositions, the preferred ratios of liquid resin to gypsum plaster are from 1:1 to 1:2.5, with 1:1.8 to 1:2.2 being especially preferred.

If large amounts of plaster are present it may be advantageous to incorporate some extra water in the mixture to facilitate the setting of the cementitious plaster, in order that the plaster component may produce maximum strength and not act merely as an inert filler with respect to the resin. With less plaster present the composition will tend to have more of the properties of the resin and with more plaster it will tend to have more of the properties associated with plasters. The range of resin: gypsum ratios quoted above is preferred because it represents the optimum proportions for fire resistance and bond to the substrate as well as for cheapness. With resin above this range there is an increasing tendency to breakdown in fire, and the composition becomes more expensive. With resin below this range there is an increasing tendency on calcination of the gypsum in fire for the facing to collapse. Optimum mixtures contain a proportion of plaster of from 1.8 to 2.2 times the weight of aqueous resin composition, thereby achieving a desirable balance of the effect of each ingredient.

It has further been found that the maximum reinforcing effect of fibrous reinforcement is obtained where the fibres are as near as possible to the surface of the component concerned. For this reason, as well as for economy in materials, it is preferred that the resin and gypsum composition should not be present in substantial thickness over the fibrous reinforcement. Only sufficient of the composition need be applied to bond the fabric or web to the surface of the substrate with, preferably, a continuous film of minimal thickness over the surface of the fabric or web. The facing may have a total thickness of less than 1 mm on each surface, or 2 mm where heavier fabrics are used, for example for wall panels.

Because of the preferred minimal thickness of the facing layer, the fibrous reinforcement forms a substantial proportion of the layer. It is preferred that the fibres constitute from 8 to 25% of the weight of resin solids and gypsum in the cured facing.

The inorganic fibres are preferably vitreous fibres such as glass fibres, rock or slag wool. Glass fibres are preferred and should be added in the form of a coherent woven, knitted or non-woven fabrics or meshes, or otherwise interlocked arrangements. A non-woven glass fibre tissue is the preferred form for cheapness and ease of handling.

Adequate reinforcement, combined with finess of finish, can be obtained with glass fibre tissues of 60 to 80 $g/m^2$ weight. Lighter fabrics can be used where reinforcement is of less interest than fire-resistance, but in most cases the fabric weight should not exceed 100 $g/m^2$. For heavy duties such as wall panels, however, heavier fabrics can be used for greater strength.

Fibre diameters can vary widely, with coarser fibres giving greater porosity. The degree of porosity of the fabric or tissue is not critical, although it seems that some porosity is necessary to provide a strongly adherent facing, since for good adherence some penetration of the resin and plaster mix through the fabric or web is necessary, even when the latter is impregnated from both sides.

The fibre length is less important, since the fibres are used in the form of a fabric or web. The preferred tissues, however, are composed of fibres of 1 to 2 cm. in length and are non-woven, either random or oriented depending on the directional tensile properties required, and bonded with synthetic resin, for example urea-formaldehyde.

The bonding of the surface coating to the substrate material will be improved if the material is slightly porous to the matrix resin and plaster composition before it is set, and preferably the composition will penetrate into the substrate material.

The building or constructional components of this invention may have a variety of shapes, but the most useful components are panels, boards and sheets made to predetermined dimensional specifications. Such panels, board and sheets are with advantage coated on both faces to provide a laminate comprising a substrate core between reinforced resin/gypsum skins.

A particularly preferred product is a laminated panel, board or sheet, useful for ceiling, partitioning and light constructional work, comprising a core of foamed polystyrene or other plastics coated on both faces to provide outer skins each comprising a reinforcing sheet of glass fibre tissue embedded in a cured composition of urea-formaldehyde resin and calcium sulphate wherein the proportion by weight of resin solids to gypsum is between 1:3.1 and 1:3.8, the composition forming a continuous film over the surface of the tissue.

Such a panel, board or sheet can be constructed as a roofing board or ceiling board and when made to a thickness of 25 mm weighs approximately 2.85 $kg/m^2$ and gives a class 1 spread of flame or class 0 fire propagation according to BS476.

Other panels of value can be prepared from fibrous bases such as bonded glass or rock fibre mats, for which there is at present no satisfactory surface finish.

Not only does the invention improve the spanning characteristics of the substrate materials to which it is applied, but it also provides a surface having spread-of-flame properties that enable the products to be used in all situations except where there is an absolute requirement for non-combustibility (and even then if incombustible substrate material is used). The surface finish can be perforated to provide sound absorption characteristics and the end product can be used, for example, for roof linings and suspended ceilings, where it fulfils the function of acoustic tiling.

The panels may be mounted in framing supports or 'lay-in' grid supports which do not require mechanical fixing, especially in the case of more readily yielding substrate materials, such as expanded polystyrene, which might not withstand the application of mechanical fixings or the strains of such fixings in position. Where more robust substrate materials are used, more robust mounting techniques can, of course, be employed.

The building or constructional component can be prepared by a hand lay-up system or by a more automated or continuous system. In general terms the fluid aqueous mixture of precursor of thermosetting condensation polymer and hydratable calcium sulphate plaster may be applied to a surface of the substrate followed by the fabric or web of fibres, or vice versa; or the fabric or web may be impregnated with the mixture of polymer precursor and calcium sulphate and the impregnated fabric or web applied to the substrate.

Preferably, the fluid mixture and the sheet of inorganic fibres are held between the substrate material and a release sheet, pressure is applied to the release sheet during the setting of the resin and calcium sulphate, and the release sheet is then removed.

The use of pressure is not critical, although usually preferred, but depends at least in part on the porosity characteristics of the fibrous fabric or web. In some cases it will suffice, for example, to assemble the individual components of a faced panel, on a release surface when faced both sides, apply a release sheet thereover, and press them together briefly, for example by passage under a roller, to ensure complete contact, whereafter they can be retained between the release surfaces without pressure until the facing is cured, or at least set hard enough for the panel to be removed.

The preferred quantity of aqueous fluid mixture of liquid resin and plaster in relation to the weight of fibres is such that the fibres constitute from 5 to 15% of the fluid mixture.

Having now described the invention in general terms, it will be further illustrated by way of example with reference to several methods of making the components.

In the accompanying drawing:

FIG. 1 is a diagrammatic cross section of a panel embodying the invention; and

FIG. 2 is a diagram of continuous plant for performing the method of this invention.

In preferred embodiments of the method, an adhesive aqueous mixture is prepared by intimately mixing hemihydrate plaster with urea-formaldehyde syrup of 68±5% solids in the ratio of 1 part by weight of syrup to 2 parts by weight of plaster.

This adhesive mixture can be applied together with a non-woven fibre tissue by any of the following methods.

Method 1

As shown in the accompanying drawing, glass fibre tissue 1 is continuously led from a roll 3 between the nip of a pair of rollers 5 where the tissue is impregnated on both surfaces with the adhesive mixture described above. At the delivery side of the rollers 5, which act as adhesive spreaders, the impregnated tissue makes contact with a moving belt 7 of release material such as polypropylene. When a sufficient length of release material carrying the adhesive impregnated tissue is available, a panel 9 is placed on top of the impregnated tissue.

The panel then passes underneath a second spreader comprising rollers 5' applying a similar adhesive mixture to a further tissue 1' from a roll 3'. A second release belt 7' is then placed on top of the resulting laminate and the laminate is passed to either a hot or cold press.

The fluid mixture is allowed to set whilst in the press and the release sheet is then removed. The panels produced have a hard smooth washable surface.

Method 2

A sheet of release material such as polypropylene, or other plastics sheet coated with a release agent, is placed in a jig and glass fibre tissue is laid over the release sheet. A panel of sufficiently rigid material is passed through an adhesive spreader where both surfaces are coated with a fluid mixture as described above. The adhesive coated panel is then placed on top of the tissue on the release sheet. A further sheet of glass fibre tissue is placed on top of the upper adhesive coated surface of the panel and this is overlaid by a second release sheet. A stack of such laminates is built up and then pressed. During pressing, the adhesive exudes through the respective tissue and also impregnates the adjacent surface of the respective panel.

The resin and cement are allowed to set and form a continuous smooth surface. The panels are then removed from the stack and the release sheets removed.

Method 3

A panel is coated as in method 2 and the laminate with the release sheets is then passed to a hot press. Similar results are obtained but the hardening and airing time is shorter.

These methods can be applied equally to foamed plastics panels, to hard and rigid panel materials such as chip-board and to less rigid panel structures such as bonded glass and rock wool mats. In the case of less strong or rigid materials, the pressure employed should not be such as to distort the panels during processing.

I claim:

1. A building or constructional component comprising a substrate of substantially rigid material having on at least one surface a facing composed of a fabric or web of inorganic fibres and a set composition of thermosetting condensation resin and gypsum, the composition penetrating the fabric or web and bonding it to the surface of the substrate wherein the amount of said composition is sufficient only to form a continuous film over the surface of the fabric or web.

2. A component according to claim 1, wherein the weight ratio of resin solids to gypsum is from 1:1.6 to 1:4.0.

3. A component according to claim 1 or 2, wherein the fabric or web is a bonded non-woven fabric having a weight not exceeding 100 g/m².

4. The component of claim 1 or 2 wherein the thickness of each facing is 2 mm or less.

5. The component of claim 4 wherein the thickness is less than 1 mm.

6. The component of claim 1 or 2 wherein the substrate is of cellular or porous material.

7. The component of claim 6 wherein the substrate is a foamed plastic material.

8. The component of claim 6 wherein the substrate comprises bonded wood fragments.

9. The component of claim 6 wherein the condensation polymer is an aminoplast or phenoplast resin.

10. The component of claim 6 wherein the facing exists on the opposed surfaces of the substrate.

11. The component of claim 6 wherein the weight ratio of resin solids to gypsum is from 1:3.1 to 1:3.8.

12. A method of making a building or constructional component comprising the steps of applying to at least one face of a substrate of substantially rigid material a fabric or web of inorganic fibres and an amount of an aqueous fluid composition of thermosetting condensation polymer precursor and calcium sulphate plaster sufficient only to form, upon setting, a continuous film over the surface of the fabric or web, and causing or allowing the fluid composition to penetrate the fabric or web and bond it to the face of the substrate.

13. A method as claimed in claim 12, wherein the fluid mixture and the fabric or web are held between the surface of the substrate and a release sheet, pressure is applied to the release sheet before or during the setting of the calcium sulphate, and the release sheet is thereafter removed.

14. A method as claimed in claim 12 or 13 wherein panels are faced continuously by feeding the fluid mixture and the fabric or web in continuous manner onto the surface of a panel or succession of panels moving relative to the feed, applying a release sheet and applying pressure during the setting of the fluid mixture.

15. A method as claimed in claim 14 wherein a tissue of glass fibre is coated on both surfaces with fluid mixture and the coated tissue is fed onto a panel surface.

16. A method as claimed in claim 12 or 13 wherein panels are coated in a batch method by applying the fluid mixture and the fabric or web between the surface of a panel and a release sheet, building up similarly treated panels into a stack and then pressing the stack.

17. A method as claimed in claim 12 wherein the rate of setting of the plaster is controlled so that the hydration set occurs not later than the cure of the polymer.

18. A method as claimed in claim 12 wherein heat is applied to accelerate the cure of the polymer.

19. A method as claimed in claim 12 including preparing the fluid mixture from an aqueous polymer precursor composition and calcium sulphate with sufficient of the precursor composition to enable all the calcium sulphate to be hydrated.

* * * * *